United States Patent
Veis et al.

(10) Patent No.: US 10,623,604 B2
(45) Date of Patent: Apr. 14, 2020

(54) HALFTONE SCREENS

(71) Applicant: HP SCITEX LTD., Netanya (IL)

(72) Inventors: Alex Veis, Kadima (IL); Michael Ben Yishai, Netanya (IL)

(73) Assignee: HP SCITEX LTD., Netanya (IL)

( * ) Notice: Subject to any disclaimer, the term of this patent is extended or adjusted under 35 U.S.C. 154(b) by 67 days.

(21) Appl. No.: 15/812,476

(22) Filed: Nov. 14, 2017

(65) Prior Publication Data

US 2018/0139354 A1    May 17, 2018

(30) Foreign Application Priority Data

Nov. 14, 2016   (EP) ...................................... 16198741

(51) Int. Cl.
  *H04N 1/405*   (2006.01)
  *H04N 1/40*   (2006.01)

(52) U.S. Cl.
  CPC ......... *H04N 1/4057* (2013.01); *H04N 1/4058* (2013.01); *H04N 1/40087* (2013.01)

(58) Field of Classification Search
  CPC ............. H04N 1/4057; H04N 1/40087; H04N 1/4058; H04N 1/4055
  See application file for complete search history.

(56) References Cited

U.S. PATENT DOCUMENTS

| 5,892,588 | A | | 4/1999 | Samworth |
| 5,976,763 | A | * | 11/1999 | Roberts .................. G03F 7/033 430/283.1 |
| 9,167,130 | B2 | | 10/2015 | Damera-Venkata |
| 2002/0196454 | A1 | * | 12/2002 | Atkins ................. H04N 1/4051 358/1.9 |
| 2004/0113958 | A1 | * | 6/2004 | Minnebo ............ H04N 1/40087 347/5 |
| 2004/0130753 | A1 | * | 7/2004 | Crounse ............... H04N 1/4057 358/3.12 |
| 2011/0279831 | A1 | | 11/2011 | Shacham et al. |

FOREIGN PATENT DOCUMENTS

EP    1558017 A2    7/2005

OTHER PUBLICATIONS

"High Quality Frequency Modulated Halftoning", 2015, Available on the Internet: <http://webstaff.itn.liu.se/~sasgo26/Exjobb/Rapport_Ahmed_Tausif.pdf > 40 pages.
"Hybrid Screening", Available on the Internet: < http://www.printindustry.com/Newsletters/Newsletter-70.aspx > 2 pages.

* cited by examiner

*Primary Examiner* — Christopher Wait
(74) *Attorney, Agent, or Firm* — HP Inc. Patent Department (57) ABSTRACT

In an example, a halftone screen is generated. A plurality of amplitude-modulated dot clusters is arranged in correspondence with a grid. Each of the amplitude-modulated dot clusters comprises a plurality of frequency-modulated dots.

19 Claims, 9 Drawing Sheets

HALFTONE SCREENS

BACKGROUND

Printers are generally unable to adjust the colour or colour intensity or gray level of printing fluid delivered to a medium. To produce the appearance of a wide printed color gamut, with variations in the color intensity, the size or spacing of printed dots may be varied. The human eye may interpret small dots or largely spaced dots as having a lesser color intensity than large dots or dots with small spacing. In an example, the printer may print dots with fixed sizes while varying how many dots are printed in cells with predetermined sizes. The apparent color intensity of a cell may be proportional to how many dots are printed in the cell.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Industries such as the packaging industry are undergoing a transformation from analog to digital printing. Analog printing may involve preparing a screen or plate and transferring an image from the screen or plate indirectly to a print medium, for example using flexographic (or 'flexo') printing technology. An example of such a print medium is corrugated board. Digital printing may involve printing a digital image directly to a print medium, for example using inkjet printing technology.

In some example scenarios, a large number, for example many thousands, of boards may be printed using a flexo press. A number, for example several hundred, additional boards may be requested, for example as a result of loss of some of the flexo-printed boards. Such boards can readily be reprinted using a digital press, such as an inkjet press, with relatively low set-up costs.

An inkjet press may be able to print amplitude-modulated (AM) screens in which the dots that make up the screen are regularly spaced but have varying sizes.

An inkjet press may have a relatively low resolution (for example 600 dots per inch (dpi) to 1200 dpi) compared to the relatively high resolution of an analog press. For example, a laser flexo platesetter may operate at 2540 dpi or higher. Such a difference in resolution (by a factor of four or eight) translates to a difference in the number of grey levels or colour intensities that a reproduced image may achieve (by a factor of sixteen to sixty-four). As a result, supercell or other types of halftoning, may interpolate by creating non-uniform AM printing dots. This non-uniformity, may create a grainy appearance.

Another consideration when using an inkjet press to print an AM screen is dot gain. Even small printing fluid (for example ink) droplets (for example 6 picolitres (pl)) may spread and create 30 micrometer (μm) to 50 μm spots. Printing at a resolution of 1200 dpi on a 20 μm grid may result in significant overlap between the printed drop spots. This overlap may result in a higher printing fluid consumption (for example double the printing fluid consumption) than dispersed frequency-modulated (FM) halftoning, which seeks to reduce spot overlap. Furthermore, FM-screened images of a digital press may have a higher print quality than that of flexo-printed boards.

However, the print appearance of digitally printed boards where FM halftoning is used may be visually different from flexo-printed boards. This may be particularly noticeable where digitally printed boards, printed using FM halftoning, are mixed with flexo-printed boards.

In examples described herein, an appearance associated with analog printing may be imitated (or 'mimicked' or 'emulated') by digital printing using inkjet technology. In examples described herein, a halftone screen may be used in which FM dots are clustered (or 'grouped') together into regularly arranged AM dots to imitate analog printing.

Figure 1:
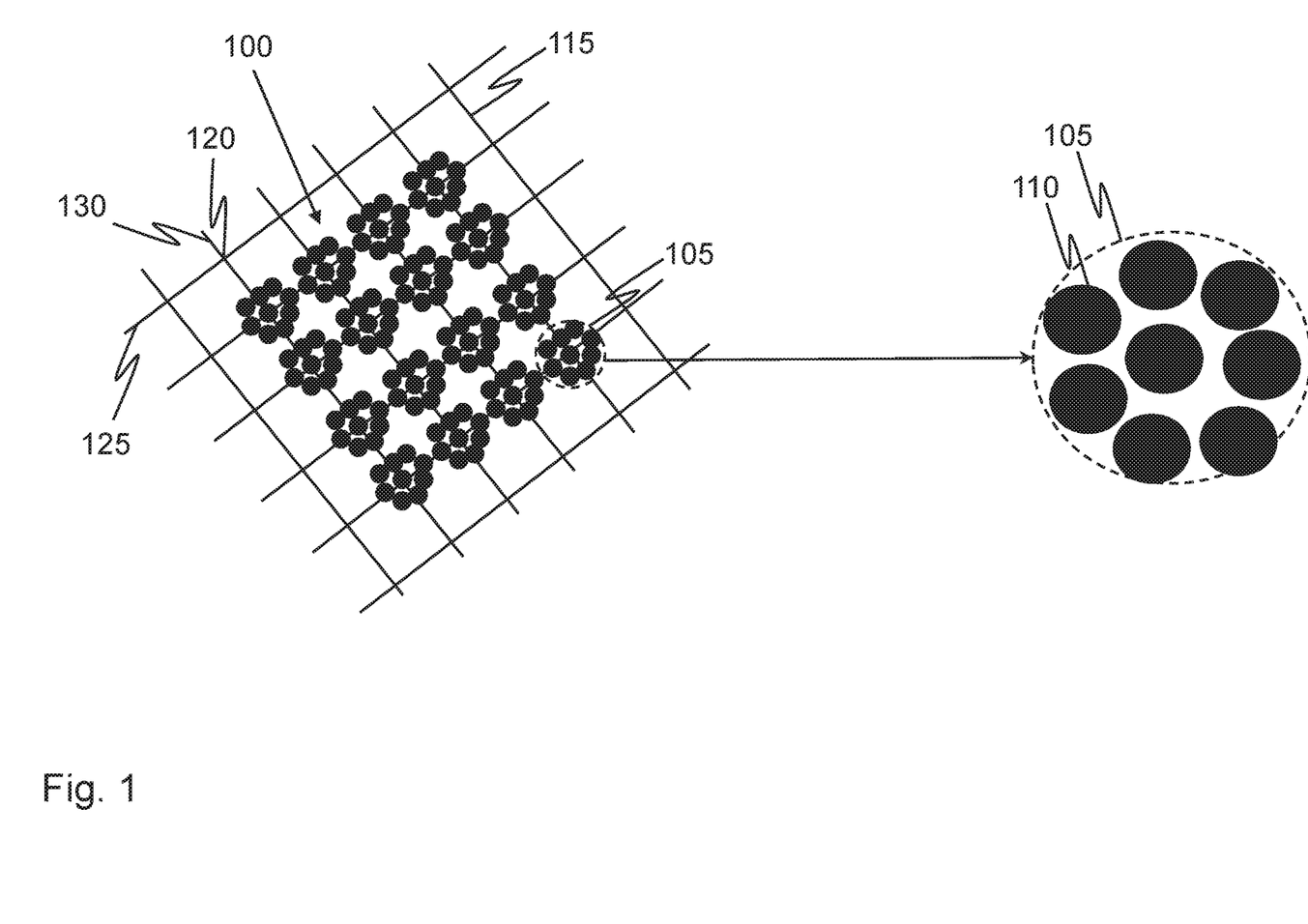
FIG. 1 is a schematic diagram of a halftone screen according to an example.

Referring to FIG. 1, there is shown schematically a halftone screen 100 according to an example.

The halftone screen 100 comprises a plurality of AM dot clusters, including a first AM dot cluster 105. In this specific example, the plurality of AM dot clusters comprises sixteen AM dot clusters. However, in other examples, there may be a different number of AM dot clusters. The halftone screen 100 may specify the locations and sizes of the AM dot clusters used to produce halftone representations of colour intensities or grey levels.

In this example, each of the AM dot clusters comprises a plurality of FM dots (or 'drops' or 'spots'), including a first FM dot 110, as can best be seen in the magnified view of the first AM dot cluster 105 in FIG. 1. As used herein, the term "AM dot cluster" refers to a cluster of FM dots, where the amplitude (or 'size') of the AM dot cluster is variable. As used herein, the term "FM dot" refers to a dot that is distributed, relative to other FM dots, in accordance with an FM technique. The FM dots may have, or may be intended to have, the same or substantially the same size as each other. An FM dot may be the smallest element that can be printed by a particular printer, or may be composed of plural smaller dots or elements if a printer is capable of printing smaller dots or elements.

In this specific example, each of the AM dot clusters comprises eight FM dots. However, in other examples, an AM dot cluster may comprise a number of FM dots other than eight. In some examples, the number of FM dots varies across AM dot clusters such that at least some AM dot clusters are comprised of different numbers of FM dots than at least some other AM dot clusters.

As such, in this example, a plurality of AM dot clusters is created, where each AM dot cluster comprises a plurality of individual FM dots. Generating the halftone screen 100 in this way may facilitate mimicking the rosette appearance associated with AM printing. The halftone screen may however be visually inspected, for example using a loupe or magnifying glass, to determine whether the halftone screen has been generated using an analog printing technique or a digital printing technique.

An FM dot may be comprised in an AM dot cluster if it is at least partly within an area associated with the AM dot cluster. For example, an FM dot may be comprised in an AM dot cluster even if part of the FM dot is outside the area associated with the AM dot cluster. An FM dot is part of an AM dot cluster if it is intended to contribute to and/or modify the amplitude of the AM dot cluster.

The halftone screen 100 is generated by arranging the plurality of AM dot clusters in correspondence with a grid 115. The grid 115 may be notional in that it may not be part of the halftone screen 100. The plurality of AM dot clusters may be arranged in correspondence with another type of two-dimensional periodic construct in other examples.

In this example, the grid 115 comprises a first plurality of equally (or 'regularly') spaced, parallel lines and a second plurality of equally spaced parallel lines, with the first plurality of lines being orthogonal to the second plurality of lines. The grid may have a different structure in other examples. For example, a grid may comprise different sizes of cell across an image. For instance, a black image portion may have a smaller cell than a light grey image portion.

Arranging the plurality of AM dot clusters in correspondence with the grid 115 may comprise positioning each AM dot cluster in correspondence with a respective intersection point 120 of a plurality of intersecting lines 125, 130 of the grid 115. Positioning each AM dot cluster in correspondence with a respective intersection point 120 may comprise locating the center of each AM dot cluster in correspondence with a respective intersection point 120.

As such, the plurality of AM dot clusters may form a pattern corresponding to intersection points of an orthogonal grid. For a given AM dot cluster, the nearest neighboring AM dot clusters may be located in two orthogonal directions.

Arranging the plurality of AM dot clusters may comprise determining a distribution of the FM dots to be comprised in each AM dot cluster based on a target printing property. Examples of such target printing properties include, but are not limited to, printing fluid coverage efficiency and perceptibility of missing nozzles in a printed image. Distributing FM dots relatively sparsely within an AM dot cluster may provide relatively more efficient printing fluid coverage but missing nozzles may be more readily perceptible in a printed image. Distributing FM dots relatively densely within an AM dot cluster may provide relatively less efficient printing fluid coverage, but missing nozzles may be less perceptible in a printed image. The FM dots may be distributed stochastically within the AM dot clusters.

Arranging the plurality of AM dot clusters may comprise determining a number of FM dots to be comprised in each AM dot cluster based on a target printing property. Examples of such target printing properties including, but are not limited to, a target grey level of each AM dot cluster and a target colour intensity of each AM dot cluster. The number of FM dots comprised in an AM dot cluster may be proportional to the target grey level. In some examples, the plurality of AM dot clusters comprises a first AM dot cluster comprising a first number of FM dots and a second AM dot cluster 105 comprising a second, different number of FM dots. The first and second AM dot clusters may be associated with different grey levels. Generating the halftone screen 100 in this way may facilitate creation of additional half toning grey levels by rendering the FM frequencies inside the AM dots per each grey level.

Arranging the plurality of AM dot clusters may comprise determining an overlap characteristic of the FM dots comprised in each AM dot cluster based on a target printing property. Examples of such target printing properties include, but are not limited to, printing fluid coverage efficiency and perceptibility of missing nozzles in a printed image. An example overlap characteristic is there being no overlap of some or all the FM dots comprised in an AM dot cluster. Another example overlap characteristic is there being a relatively low degree of overlap of some or all the FM dots comprised in an AM dot cluster. Having FM dots with no, or a relatively low degree of, overlap within an AM dot cluster may provide relatively efficient printing fluid coverage, but missing nozzles may be more readily perceptible in a printed image. Another example overlap characteristic is there being a relatively high degree of overlap of some or all the FM dots comprised in an AM dot cluster. Having FM dots with a relatively high degree of overlap within an AM dot cluster may provide less efficient printing fluid coverage, but missing nozzles may be less perceptible in a printed image.

The plurality of AM dot clusters may comprise an AM dot cluster having two to more overlapping FM dots. The plurality of AM dot clusters may comprise an AM dot cluster having two or more non-overlapping FM dots. The plurality of AM dot clusters may comprise an AM dot cluster having both overlapping and non-overlapping FM dots. A halftone screen may comprise a plurality of AM dot clusters having two or more of the aforementioned types of FM dot.

Arranging the plurality of AM dot clusters may comprise determining a dot cluster size of each AM dot cluster based on a target printing property. An example of such a target printing property is an extent to which an AM printing appearance is to be imitated. A first AM dot cluster in the plurality of AM dot clusters may have a first dot cluster size and a second AM dot cluster in the plurality of AM dot clusters may have a second, different dot cluster size.

The plurality of AM dot clusters may comprise an AM dot cluster having an AM dot cluster size greater than a sum of the sizes of the plurality of FM dots comprised in the AM dot cluster. For example the size of the first AM dot cluster 105 (for example its surface area or volume) is greater than the sum of the sizes (for example surface areas or volumes) of the plurality of FM dots, including the first FM dot 110, comprised in the first AM dot cluster 105.

A target property of the AM dot clusters, such as the number or distribution of FM dots comprised in each AM dot cluster and the distribution of FM dots in each AM dot cluster, may be dependent on the type of printing fluid being used, the viscosity of the printing fluid being used, the type of material on which an image is printed or the like. A test image may be printed and a target property may be calibrated following inspection of the printed image.

As such, according to an example, the halftone screen 100 comprises a plurality of AM dot clusters, each arranged in accordance with the grid 115 and each comprising a plurality of FM dots.

Figure 2:
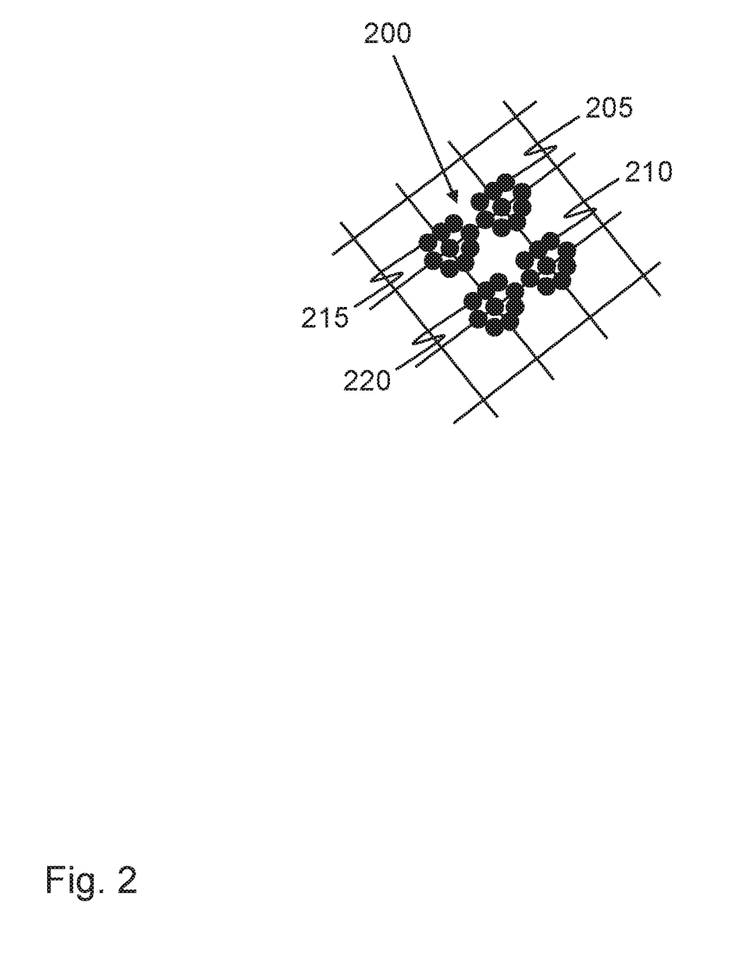
FIG. 2 is a schematic diagram of a halftone screen according to another example.

Referring to FIG. 2, there is shown schematically an example of a halftone screen 200. The halftone screen 200 comprises a plurality of AM dot clusters. In this specific example, the halftone screen 200 comprises four AM dot clusters: a first AM dot cluster 205, a second AM dot cluster 210, a third AM dot cluster 215 and a fourth AM dot cluster 220.

In this example, a separation of the first AM dot cluster 205 relative to the second AM dot cluster 210 is the same as a separation of the first AM dot cluster 205 relative to the third AM dot cluster 215. The separation of an AM dot cluster relative to another AM dot cluster may be determined in various ways. For example such separation may correspond to a distance between respective centers of the AM dot clusters, a shortest distance between respective boundaries of the AM dot clusters or the like.

In this example, a separation of the first AM dot cluster 205 relative to the fourth AM dot cluster 220 is different from the separation of the first AM dot cluster 205 relative to the second AM dot cluster 210 and the separation of the first AM dot cluster 205 relative to the third AM dot cluster 215.

In this example, a separation of the fourth AM dot cluster 220 relative to the second AM dot cluster 215 is the same as the separation of the first AM dot cluster 205 relative to the second AM dot cluster 210 and a separation of the fourth AM dot cluster 220 relative to the third AM dot cluster 215 is the same as the separation of the first AM dot cluster 205 relative to the third AM dot cluster 215.

Figure 3:
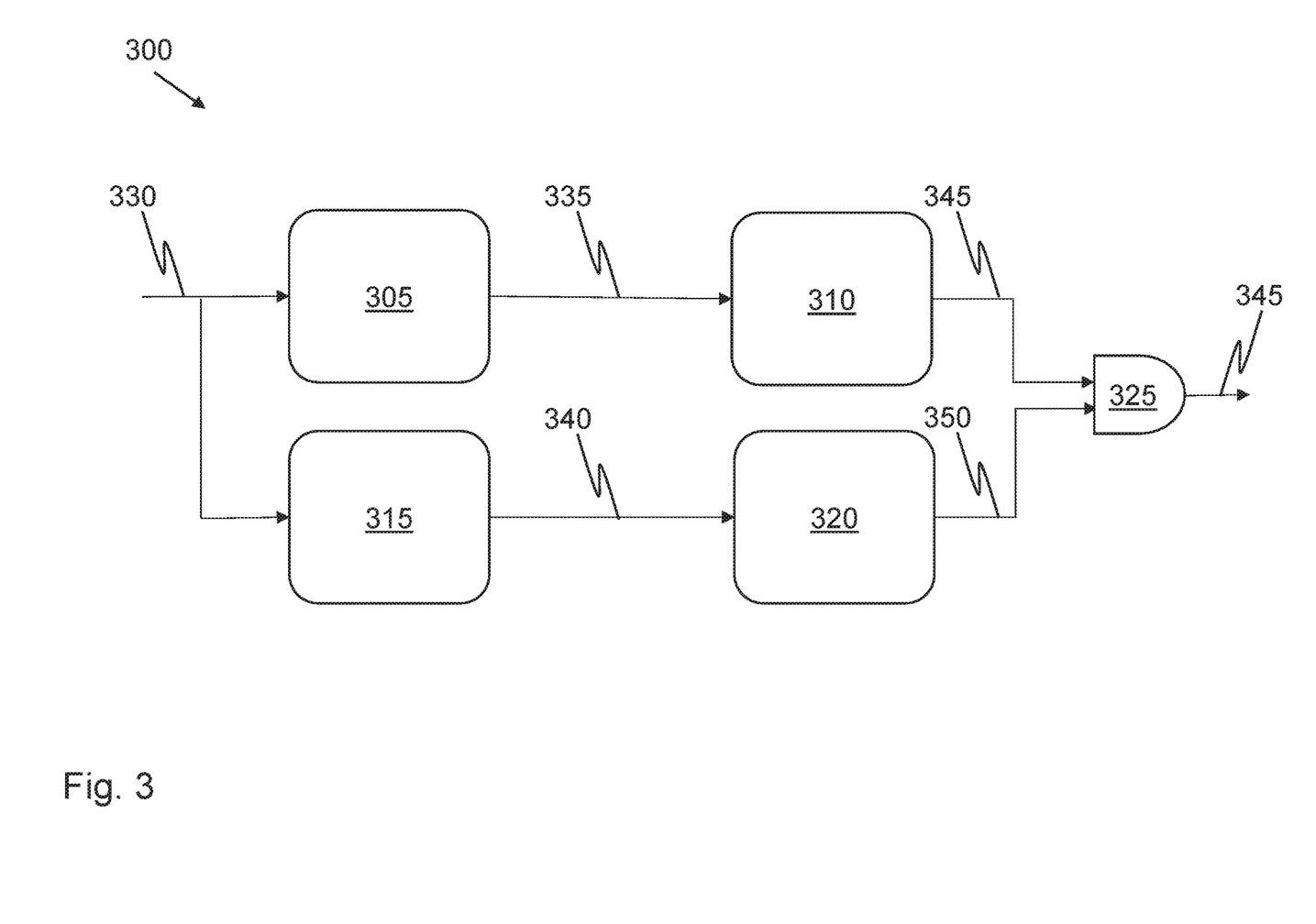
FIG. 3 is a block diagram of a system to generate a halftone screen according to an example.

Referring to FIG. 3, there is shown schematically an example of a system 300 to generate a halftone screen. The system 300 may be comprised, for example, in a personal computer (PC), a printer or another apparatus.

In this example, the system 300 comprises a halftone screen generation engine to generate a plurality of AM dot clusters, each of the AM dot clusters respectively comprising a plurality of FM dots, the plurality of AM dot clusters being distributed in accordance with a grid. In this example, the halftone screen generation engine comprises an AM stretch and linearization look up table (LUT) 305, an AM halftoning (or 'screening') engine 310, an FM stretch and linearization look up table (LUT) 315, an FM halftoning engine 320 and a logical AND gate 325. One or each of AM halftoning engine 310 and the FM halftoning engine 320 may be of a matrix or error diffusion type.

In this example, the system 300 receives input data in the form of 8-bit pixel data 330. In this example, the AM stretch and linearization LUT 305 outputs 16-bit AM pixel data 335 and the FM stretch and linearization LUT 315 outputs 16-bit FM pixel data 340. In this example, the AM halftoning engine 310 outputs an AM output value 345 of 0 or 1 and the FM halftoning engine 320 outputs an FM output value 350 of 0 or 1. In this example, the AND gate 325 outputs a value 355 of 0 or 1 dependent on the AM output value and the FM output value.

The AM stretch and linearization LUT 305 in conjunction with the AM halftoning engine 310 defines AM dot size and shape. The FM stretch and linearization LUT 315 in conjunction with the FM halftoning engine 320 defines the spatial frequency and placement of dispersed FM dots inside an AM shape.

In this example, the AM and FM halftone engines 310, 320 run in parallel. In this example, an FM dot is placed on a print medium when the output of both the AM and FM halftone engines 310, 320 is 1.

FIGS. 4 to 7 show the difference in appearance resulting from missing nozzles, with and without overlap of FM dots.

Figure 4:
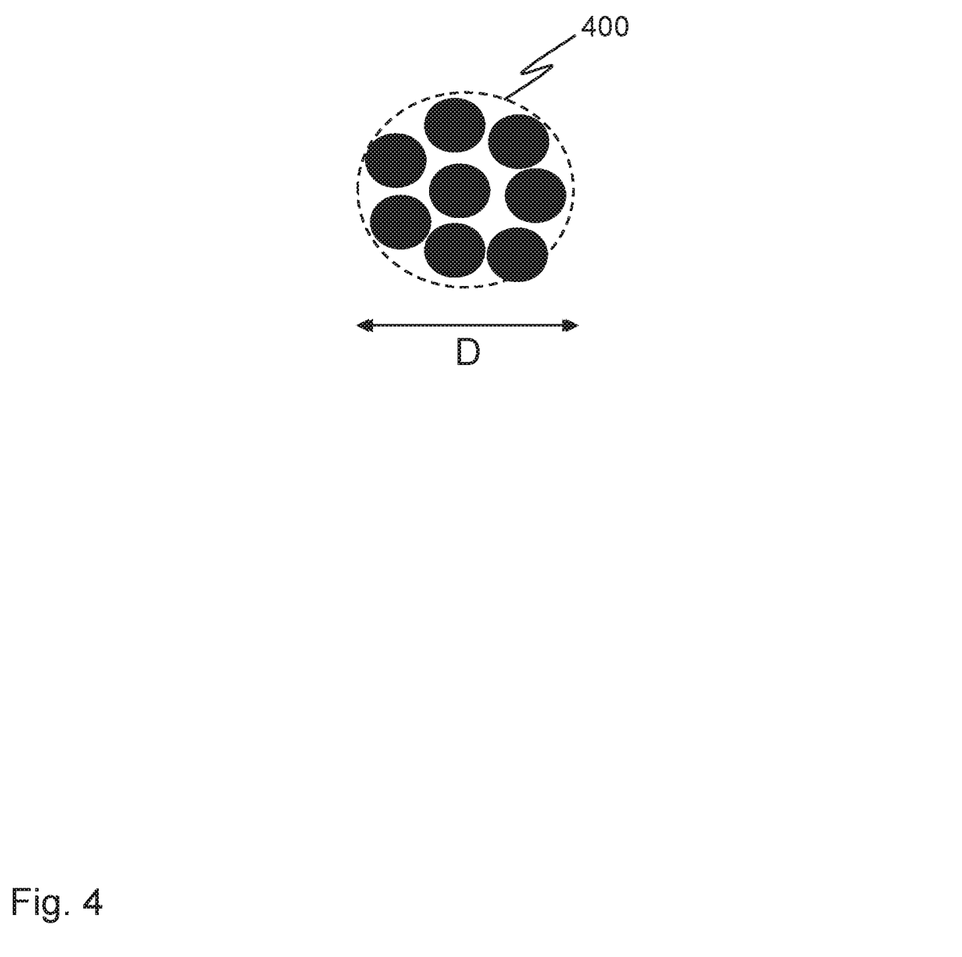
FIG. 4 is a schematic diagram of an amplitude-modulated dot cluster according to an example.

Referring to FIG. 4, there is shown schematically an example of an AM dot cluster 400. In this example, there are no missing nozzles. The FM dots inside the AM dot cluster 400 are relatively dispersed and do not overlap with each other in the AM dot cluster 400. The AM dot cluster 400 has a relatively large structure in size, having a diameter, D. The size of an AM dot cluster, for example a non-circular AM dot cluster, may be defined differently, for example based on a perimeter that encompasses each of the component FM dots or the like. The AM dot cluster 400 may be produced in a printing fluid-efficient manner since a relatively small number of FM dots are comprised in the AM dot cluster 400. However, the AM dot cluster 400 may be relatively vulnerable (or 'susceptible') to missing nozzles.

Figure 5:
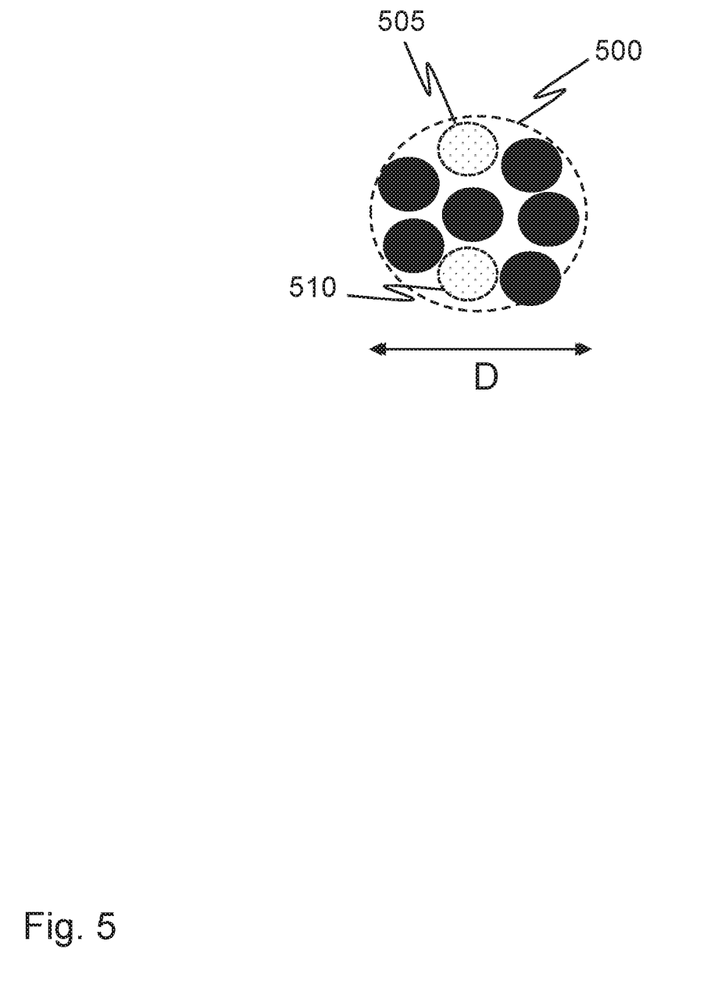
FIG. 5 is a schematic diagram of an amplitude-modulated dot cluster according to another example.

Referring to FIG. 5, there is shown schematically an example of an AM dot cluster 500 corresponding to the AM dot cluster 400 shown in FIG. 4. In this example, however, there are two missing nozzles and two of the FM dots comprised in the AM dot cluster 400 are not present in the AM dot cluster 500 as indicated by items 505 and 510 (corresponding to the two missing nozzles).

Figure 6:
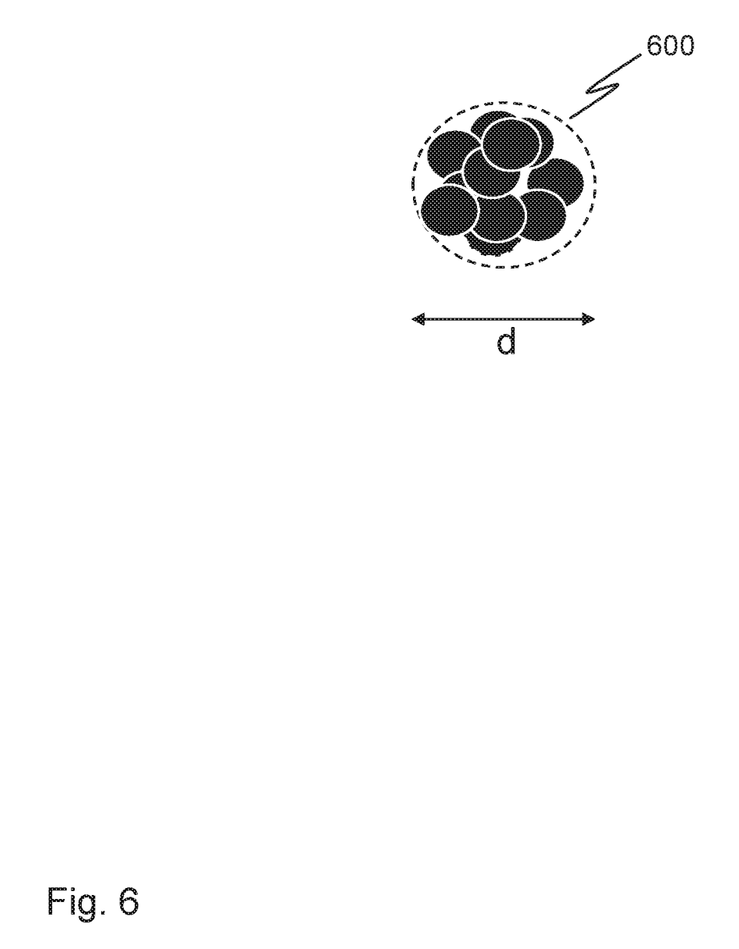
FIG. 6 is a schematic diagram of an amplitude-modulated dot cluster according to another example.

Referring to FIG. 6, there is shown schematically an example of an AM dot cluster 600. In this example, there are no missing nozzles. The FM dots inside the AM dot cluster 600 are relatively densely distributed (or 'dispersed'), compared to the relatively sparse distribution of FM dots in the AM dot cluster 400. In this example, each FM dot in the AM dot cluster 600 overlaps with at least one other of the FM dots in the AM dot cluster 600. The boundary of each FM dot in the AM dot cluster 600 is depicted in white in FIG. 6. As a result of the high degree of printing fluid spot overlap, compared to the AM dot 400, the printing fluid efficiency associated with the AM dot cluster 600 is lower than that of the AM dot cluster 400. In other words, more printing fluid is used to print the same image. However, missing nozzles are less visible than in the AM dot cluster 400.

The AM dot cluster 600 is a relatively small structure in size, having a diameter, d. The AM dot cluster 600 may correspond to the same gray level as the grey level of the AM dot 400.

Figure 7:
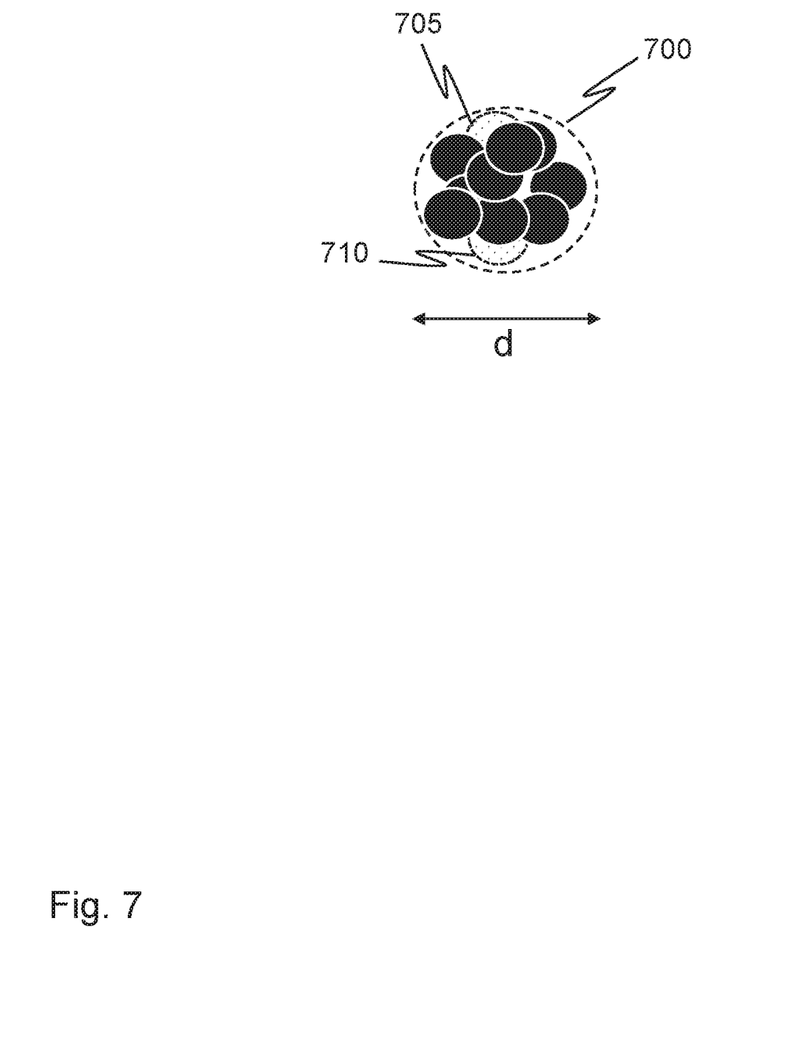
FIG. 7 is a schematic diagram of an example of another example of an amplitude-modulated dot cluster according to an example.

Referring to FIG. 7, there is shown schematically an example of an AM dot cluster 700 corresponding to the AM dot cluster 600 shown in FIG. 6. The boundary of each FM dot in the AM dot cluster 700 is also depicted in white in FIG. 7. In this example, however, there are two missing nozzles and two of the FM dots comprised in the AM dot cluster 600 are not present in the AM dot cluster 700 as indicated by items 705 and 710 (corresponding to the two missing nozzles).

According to an example, a target printing property may be defined. For example, a target printing property may be defined by user input received via a user interface. For example, a target balance between printing fluid efficiency and resistance to missing nozzles may be defined based on such user input. As such, examples described herein provide a capability to trade off printing fluid consumption and a visible trace of missing nozzles.

Figure 8:
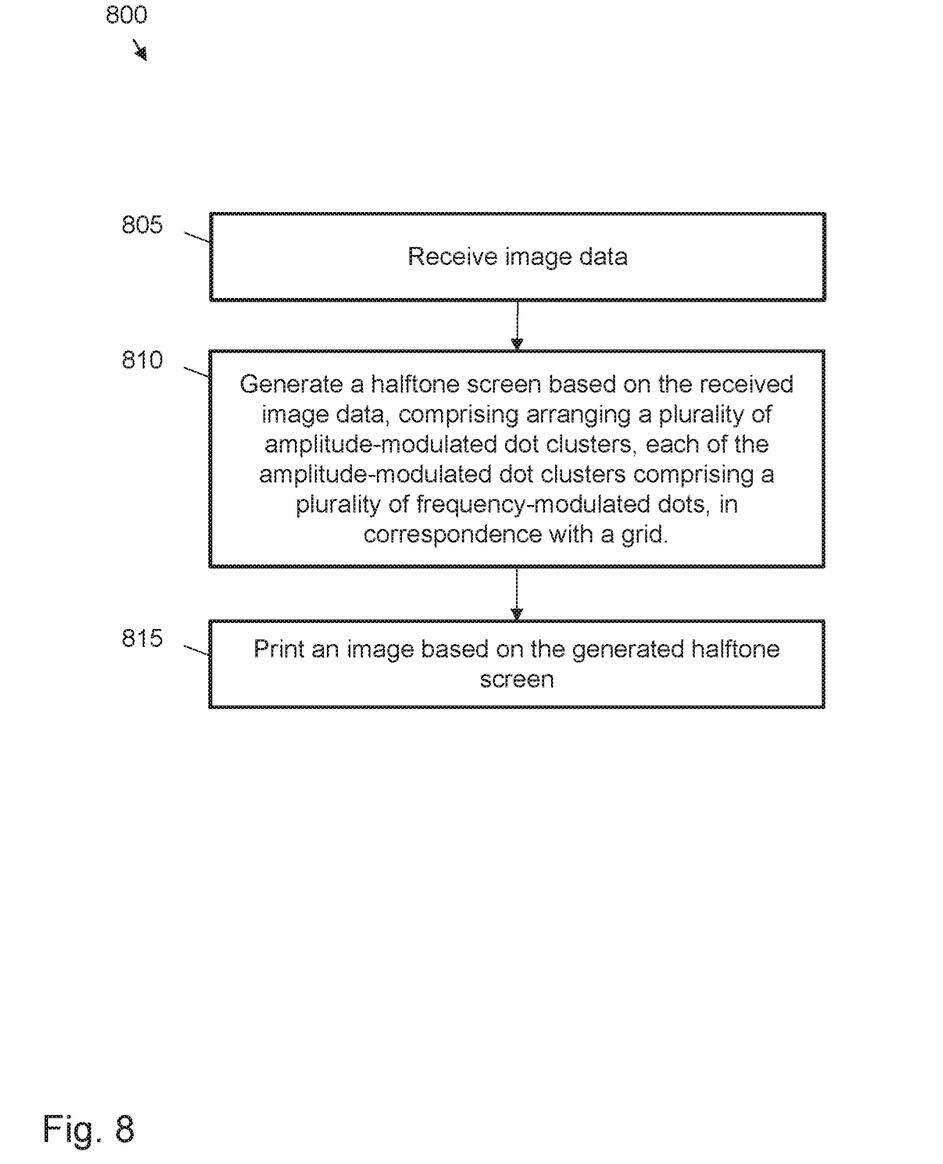
FIG. 8 is a flow diagram of a method according to an example.

Referring to FIG. 8, there is shown a flowchart of an example of a method 800.

At block 805, image data is received. The image data may, for example, be in the form of a digital image file.

At block 810, a halftone screen is generated based on the received image data. Generating the halftone screen comprises arranging a plurality of AM dot clusters, each of the AM dot clusters comprising a plurality of FM dots, in correspondence with a grid.

At block 815, an image is printed based on the generated halftone screen.

Figure 9:
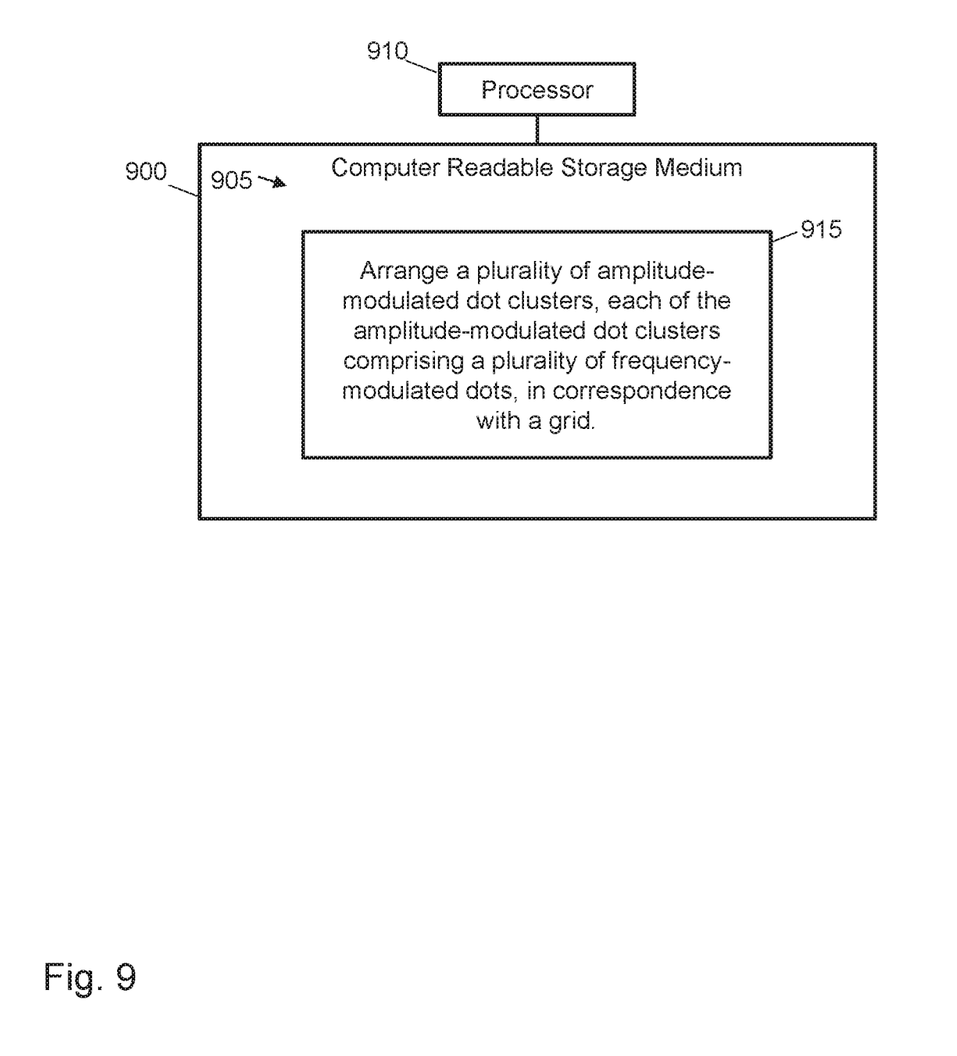
FIG. 9 is a block diagram of a computer-readable medium including instructions that cause a processor to generate a halftone screen according to an example.

FIG. 9 shows an example of a non-transitory computer-readable storage medium 900 comprising a set of computer readable instructions 905 which, when executed by at least one processor 910, cause the processor 910 to perform a method according to examples described herein. The computer readable instructions 910 may be retrieved from a machine-readable media, e.g. any media that can contain, store, or maintain programs and data usable by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 905 cause the processor 910 to, at block 915, arrange a plurality of AM dot clusters, each of the AM dot clusters comprising a plurality of FM dots, in correspondence with a grid.

As used herein, the term "engine" refers to hardware (e.g., a processor, such as an integrated circuit, or analog or digital circuitry) or a combination of software (e.g., programming such as machine- or processor-executable instructions, commands, or code such as firmware, a device driver, programming, object code, or the like) and hardware. Hardware includes a hardware element with no software elements, such as an application specific integrated circuit (ASIC), a Field Programmable Gate Array (FPGA) or the like. A combination of hardware and software includes software hosted at hardware (e.g., a software module that is stored at a processor-readable memory, such as random access memory (RAM), a hard-disk or solid-state drive, resistive memory, or optical media such as a digital versatile disc (DVD), or executed or interpreted by a processor), or hardware and software hosted at hardware.

The preceding description has been presented to illustrate and describe examples of the features described. This description is not intended to be exhaustive or to limit these features to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
    generating a halftone screen by arranging a plurality of amplitude-modulated dot clusters in correspondence with a grid, wherein each of the amplitude-modulated dot clusters comprises a plurality of frequency-modulated dots, wherein arranging the plurality of amplitude-modulated dot clusters comprises positioning each amplitude-modulated dot cluster in correspondence with an intersection point of a plurality of intersecting lines of the grid; and
    printing a printed product using the generated halftone screen.

2. A method according to claim 1, wherein arranging the plurality of amplitude-modulated dot clusters comprises determining a distribution of the plurality of frequency-modulated dots to be comprised in each amplitude-modulated dot cluster based on a target printing property.

3. A method according to claim 1, wherein arranging the plurality of amplitude-modulated dot clusters comprises determining a number of frequency-modulated dots to be comprised in each amplitude-modulated dot cluster based on a target printing property.

4. A method according to claim 1, wherein the plurality of amplitude-modulated dot clusters comprises a first amplitude-modulated dot cluster comprising a first number of frequency-modulated dots and a second amplitude-modulated dot cluster comprising a second, different number of frequency-modulated dots.

5. A method according to claim 1, wherein arranging the plurality of amplitude-modulated dot clusters comprises determining an overlap characteristic of the plurality of frequency-modulated dots comprised in each amplitude-modulated dot cluster based on a target printing property.

6. A method according to claim 1, wherein the plurality of amplitude-modulated dot clusters comprises an amplitude-modulated dot cluster having a plurality of overlapping frequency-modulated dots.

7. A method according to claim 1, further comprising using the halftone screen to print an image that mimics a rosette appearance of analog printing.

8. A system to generate a halftone screen, the system comprising a halftone screen generation engine comprising a processor to generate a plurality of amplitude-modulated dot clusters, each of the amplitude-modulated dot clusters respectively comprising a plurality of frequency-modulated dots, the plurality of amplitude-modulated dot clusters being distributed in accordance with a grid and wherein the amplitude-modulated dot clusters contain overlapping frequency-modulated dots.

9. A system according to claim, 8 wherein a first amplitude-modulated dot cluster in the plurality of amplitude-modulated dot clusters has a first dot cluster size and a second amplitude-modulated dot cluster in the plurality of amplitude-modulated dot clusters has a second, different dot cluster size.

10. A system according to claim 8, wherein the plurality of amplitude-modulated dot clusters comprises a first amplitude-modulated dot cluster, a second amplitude-modulated dot cluster and a third amplitude-modulated dot cluster, and wherein a separation of the first amplitude-modulated dot cluster relative to the second amplitude-modulated dot cluster is the same as a separation of the first amplitude-modulated dot cluster relative to the third amplitude-modulated dot cluster.

11. A system according to claim 10, wherein the plurality of amplitude-modulated dot clusters comprises a fourth amplitude-modulated dot cluster, and wherein a separation of the first amplitude-modulated dot cluster relative to the fourth amplitude-modulated dot cluster is different from the separation of the first amplitude-modulated dot cluster relative to the second amplitude-modulated dot cluster and the separation of the first amplitude-modulated dot cluster relative to the third amplitude-modulated dot cluster.

12. A system according to claim 10, wherein the plurality of amplitude-modulated dot clusters comprises a fourth amplitude-modulated dot cluster, wherein a separation of the fourth amplitude-modulated dot cluster relative to the second amplitude-modulated dot cluster is the same as the separation of the first amplitude-modulated dot cluster relative to the second amplitude-modulated dot cluster, and wherein a separation of the fourth amplitude-modulated dot cluster relative to the third amplitude-modulated dot cluster is the same as the separation of the first amplitude-modulated dot cluster relative to the third amplitude-modulated dot cluster.

13. A printer comprising a system according to claim 8.

14. A method of supplementing a run of flexographically printed boards with a number of additional matching boards printed with a digital press, the method comprising:
    with the digital press, matching boards produced by the flexographic printing, by generating a halftone screen comprising a plurality of amplitude-modulated dot clusters based on the flexographic printing, each amplitude-modulated dot cluster of the halftone screen being arranged in accordance with a grid and comprising a plurality of frequency-modulated dots produced by the digital press; and with the digital press, printing the number of additional matching boards using the halftone screen.

15. A method according to claim 3, wherein the target printing property is a target gray level of each amplitude-modulated dot cluster.

16. A method according to claim 3, wherein the target printing property is a target color intensity of each amplitude-modulated dot cluster.

17. A method according to claim 3, wherein the target printing property is a target balance between printing fluid efficiency and minimizing the effect of malfunctioning nozzles when printing.

18. A method according to claim 1, wherein a separation between a first amplitude-modulated dot cluster and a second amplitude-modulated dot cluster is the same as between the first amplitude-modulated dot cluster and a third amplitude-modulated dot cluster as measured from respective centers of the amplitude-modulated dot clusters or a shortest distance between respective boundaries of the amplitude-modulated dot clusters.

19. The system of claim 9, wherein the halftone screen generation engine further comprises:

an AM halftoning engine comprising an amplitude-modulated (AM) stretch and linearization look up table (LUT);

an FM halftoning engine comprising a frequency-modulated (FM) stretch and linearization look up table (LUT);

and a logical AND gate receiving input from the AM halftoning engine and the FM halftoning engine, wherein the logical AND gate regulates the output of the halftone screen generation engine.

* * * * *